(12) United States Patent
Müller

(10) Patent No.: US 6,194,503 B1
(45) Date of Patent: Feb. 27, 2001

(54) METHOD FOR OBTAINING POLYTETRAMETHYLENE ETHER GLYCOLS WITH NARROW MOLAR-MASS DISTRIBUTION

(76) Inventor: Herbert Müller, Carostrasse 53, D-67227 Frankenthal (DE)

( * ) Notice: Subject to any disclaimer, the term of this patent is extended or adjusted under 35 U.S.C. 154(b) by 0 days.

(21) Appl. No.: 09/367,411

(22) PCT Filed: Feb. 17, 1998

(86) PCT No.: PCT/EP98/00886

§ 371 Date: Aug. 12, 1999

§ 102(e) Date: Aug. 12, 1999

(87) PCT Pub. No.: WO98/37121

PCT Pub. Date: Aug. 27, 1998

(30) Foreign Application Priority Data

Feb. 19, 1997 (DE) .............................. 197 06 331

(51) Int. Cl.$^7$ ....................................... C08K 5/05
(52) U.S. Cl. ........................................ 524/379; 523/332
(58) Field of Search ............................... 524/379; 523/332

(56) References Cited

U.S. PATENT DOCUMENTS 4,933,503 * 6/1990 Mueller .......................... 568/621

\* cited by examiner

*Primary Examiner*—Edward J. Cain
(74) *Attorney, Agent, or Firm*—Fulbright & Jaworski, LLP

(57) ABSTRACT

The molecular weight distribution of polytetrahydrofuran and copolymers of tetrahydrofuran with alkylene oxides is narrowed down by blending the polymers with a mixture of an alicyclic compound, methanol and water at a temperature ranging from 0–40° C. The two phases formed are separated at 40–80° C., and polymers with low molecular weight distributions are isolated therefrom.

13 Claims, No Drawings

METHOD FOR OBTAINING POLYTETRAMETHYLENE ETHER GLYCOLS WITH NARROW MOLAR-MASS DISTRIBUTION

DESCRIPTION

This invention describes a new, advanced process for converting polytetrahydrofuran (PTHF) and copolymers of tetrahydrofuran with alkylene oxides into products with a narrow molecular weight distribution by means of a solvent-mixture treatment. The solvent mixture consists of methanol, an alicyclic compound and water.

Polytetrahydrofuran (PTHF) is, eg, an important intermediate in the production of polyurethanes or polyesters with soft segments, and is discussed in the monograph "Polytetrahydrofuran" by P. Dreyfus, Gordon and Breach Science Publishers, New York, London, Paris 1982. PTHF is normally obtained by way of cationic polymerization, with a fairly broad molecular weight distribution that usually deviates from the Gaussian distribution.

The polydispersity of a polymer is characterized by the quotient $M_w/M_n$, where $M_w$ is the weight-average molecular weight and $M_n$ is the number-average molecular weight. The quotient $M_w/M_n$ is usually determined as the result of a gel permeation chromatography (GPC) measurement compared with the distribution of calibrating substances. The quotient can also be derived from the empirical formula $M_{vis}/M_n$, as is described in German patent No. 2453114. In this formula, log $M_{vis}$=0.483 log viscosity (at 40° C. in poise) +3.0646. This relation is connected with the fact that the viscosity of polymers with a broad molecular weight distribution increases exponentially with the molecular weight.

Polymeric end products based on PTHF and having a narrow molecular weight distribution have altogether better mechanical properties than their counterparts with a broad molecular weight distribution. Accordingly, it is to advantage if products exhibiting a narrow molecular weight distribution are obtained already at the polymerization stage, or at least if, by way of a subsequent treatment, the molecular weight distribution is narrowed down afterwards.

According to the teaching of Canadian patent application No. 800 659, polymers with a relatively narrow molecular weight distribution can be obtained by stopping the polymerization reaction before equilibrium is reached. According to the German patent No. 2 453 114, the polydispersity can be reduced by partially degrading the polymers with acidic cation exchangers. Other patent applications, such as the U.S. Pat. No. 4,510,333 or the German patent No. 4 205 984, describe a polymerization which, to narrow down the molecular weight distribution, is conducted at stepped reaction temperatures. These measures are tedious, technically complicated, costly, and usually of limited effectiveness. Exact reproducibility with the method described is practically impossible, which means that the quotient $M_w M_n$ is subject to constant fluctuations. However, a highly reproducible polydispersity $M_w/M_n$ is indispensable for many PTHF and THF-copolymer applications, especially with regard to desired product properties.

In the U.S. Pat. No. 3,478,109, a process for removing low-molecular fractions by extraction of polymeric glycols with methanol or methanol and water is described. However, the low-molecular fractions are only removed satisfactorily if the polymeric glycols are subjected to the extraction as a solution in a hydrocarbon. Only in the case of a continuous or multistage discontinuous extraction of polymeric glycols does this method provide the diols suitable for the production, for example, of spandex fibers. The process described in the Japanese laid-open patent application No. 60-42421 for preparing THF polymers with a narrow molecular weight distribution likewise produces unsatisfactory results, as too does that according to the teaching of Japanese patent application No. 215 111/83. Especially where copolymers are required that have a narrow molecular weight distribution and contain more than 5 wt. % ethylene or propylene oxide, these methods are not particularly suitable. This also applies to the method described in the U.S. Pat. No. 4,762,951, which is based on a complicated three-phase system but which doesn't work for copolymers with a high alkylene oxide content (>30 wt %).

In the U.S. Pat. No. 4,933,503, an extractive procedure is described for preparing PTHF polymers of narrow molecular weight distribution. In this process, a polymer freed from low-molecular components by means of short-path distillation at a temperature of 200–260° C. and a pressure of <0.3 mbar is mixed with a hydrocarbon, methanol and water. However, this process does not yield satisfactory results unless a three-phase system is formed. With the process of the present invention, by contrast, polymers with a highly desirable range of properties are already obtained on the basis of the simpler two-phase system.

All these processes are based on a complex, usually three-phase system, necessitating complicated apparatus and extremely careful process control.

One object of this invention was thus to provide a technically simple and economically efficient process for producing PTHF polymers with a narrow molecular weight distribution, the process allowing the separation of commercially available polymers into narrowly distributed fractions, each of which is suitable for a practical application, and there being no limitations in respect of molecular weight or copolymer content.

A further object of the invention was to provide a process for narrowing down the molecular weight distribution, with which, in the absence of appreciable losses, polymers especially in the technically interesting molecular weight range from 500 to 5000 Daltons are obtained that are not contaminated by catalysts. In addition, contamination of the polymers of the invention by crown ethers should, at the most, be very slight.

These objectives are established according to the invention by a process for fractionating tetrahydrofuran polymers or tetrahydrofuran-alkylene-oxide-copolymers, which is characterized in that one (a) mixes the starting polymer with a cycloalkane (a), methanol (b) and water (c) at a temperature in the range from 0° C. to 40° C. and (b) separates the different phases formed during mixing at a temperature in the range from 40° C. to 80° C.

The process of the invention is suitable, on the one hand, for fractionating tetrahydrofuran polymers. Such polymers are normally synthesized by the cationic, ring-opening polymerization of tetrahydrofuran (THF), with the formation of polyethers. These are also often referred to as polytetramethylene glycols (PTMG), polytetramethylene glycol ethers (PTMEG) or polytetramethylene oxide (PTMO). The process of the invention is also suitable for fractionating copolymers of tetrahydrofuran with alkylene oxides. Random or block copolymers are used with preference. It is to advantage if the alkylene oxide is one with 1 to 10 carbon atoms, preferably 1 to 8 carbon atoms or, especially preferable, 2 to 5 carbon atoms. It is most preferable if the copolymer contains ethylene oxide and/or propylene oxide units.

The proportion of THF and alkylene oxide groups in the copolymer is generally 1:99 to 99:1 (in mol %), preferably 10:90 to 90:10 (in mol %) or, especially preferable, 20:80 to 80:20 (in mol %). The process of the invention is especially useful for fractionating copolymers with a high alkylene oxide content of $\geq 20$ %, preferably $\geq 30\%$ and, especially preferable $\geq 40\%$.

According to the invention, the starting polymer is mixed with a cycloalkane, methanol and water at a temperature in the range from 0° C. to 40° C. This step is referred to in the specification as step (a), or as the mixing step. In principle, every cycloalkane is suitable for the process of the invention, although it is to advantage if the cycloalkane is liquid within the temperature range indicated. Preference is given to a cycloalkane with 3–20, better 3–10 and best of all 5–7 carbon atoms. The carbon atoms can constitute part of the ring structure or part of the hydrocarbon substituents on the ring structure. Use is made preferably of cycloalkanes with a C3–C8 or, even better, C3–C6 ring structure, ie, cyclopropane, cyclobutane, cyclopentane and cyclohexane. These cycloalkanes may be substituted with saturated hydrocarbon radicals, especially C1–C6 hydrocarbon radicals such as methyl, ethyl, propyl, butyl, pentyl or hexyl. It is especially beneficial to use cyclopentane, methylcyclopentane, cyclohexane and/or methylcyclohexane as cycloalkane.

After the starting polymer has been mixed with the cycloalkane, the methanol and the water, in a subsequent step (b)—which is also referred to as the separating step—the two phases formed during mixing, namely an aqueous and an organic phase, are separated from one another at a temperature of 40° C. to 80° C. Surprisingly, it was found that in the solvent mixture of the invention, a starting polymer of broad molecular weight distribution disperses specifically with respect to the molecular weight, so that the starting polymer is fractionated on the basis of molecular weight.

During the process of the invention, separate phases are formed. Preferably, a simple two-phase system is obtained. The two phases can easily be separated using standard phase-separation methods, giving a fraction with a higher and one with a lower average molecular weight. Surprisingly, it was found that the two fractions thus obtained have a markedly lower polydispersity than the starting material.

The polydispersity $M_w/M_n$ indicates how uniform a polymer is. The lower this number is, ie, the closer it is to 1, the more uniform the polymer is in terms of molecular weight. With the process of the invention, tetrahydrofuran polymers or copolymers of tetrahydrofuran with alkylene oxides are obtained which are more uniform in terms of their molecular weight than the starting polymers used. In principle, starting polymers of arbitrary polydispersity can be used in the process of the invention. It is to advantage if the starting polymers exhibit a relatively broad polydispersity $M_w/M_n$ of $\geq 1.5$, in particular $\geq 2$ or $\geq 2.5$. However, starting polymers with a very broad molecular weight distribution, for example a $M_w/M_n$ of $\geq 3$, $\geq 5$ or $\geq 7$, can also be used.

The process of the invention is especially suitable for obtaining polymer fractions whose polydispersity is at least 2% and preferably at least 5% less than that of the starting material. When a starting polymer with a polydispersity $M_w/M_n$ of 2.0 is used, for example, a reduction by 5% means that the two polymer fractions obtained by means of the process of the invention each have a polydispersity of $\leq 1.9$.

In a preferred embodiment of the process of the invention, a tetrahydrofuran polymer or a copolymer of tetrahydrofuran and alkylene oxide is separated into different fractions, preferably into two fractions each of which has a polydispersity $M_w/M_n$ that is at least 10% or—even better—at least 15% lower than the polydispersity $M_w/M_n$ of the starting polymer. Normally, the fractions with the lower average molecular weights have lower average dispersities than the fractions with the higher average molecular weights.

The separation according to the invention into different fractions, especially two fractions, means that the lower the polydispersity of the starting material is, the narrower are the molecular weight distributions obtained for the different fractions. By repeating the process of the invention, one obtains fractions with ever narrower molecular weight distributions.

As already explained, the polydispersity of the polymer fractions obtained according to the invention depends on the polydispersity of the starting polymer used. It is to advantage if the polymer fractions obtainable by to the process of the invention have a molecular weight distribution which corresponds to a polydispersity $M_w/M_n$ of 1.2 to 2.6. Where two fractions are obtained, the polymer fraction with the lower molecular weight will be characterized by a polydispersity in the lower portion of the range, and the fraction with the higher molecular weight by a polydispersity in the upper portion of the range. The fraction with the lower molecular weight preferably has a dispersity from 1.2–2.0, while the polymer fraction with the higher molecular weight preferably has a polydispersity in the range from 1.5 to 2.6.

It was of particular interest to find that if a cycloalkane (a), methanol (b) and water (c) are mixed with the starting polymers at 0–40° C. and the resulting two phases are separated from each other at temperatures of 40–80° C., polymers and copolymers with molecular weights M (in daltons) can be, separated into two usable fractions of molecular weight M+A and M−A (in daltons) and very low polydispersity. M is preferably in the range from 800–3000, and A preferably in the range from 200–1500 Da.

For the process of the invention, use can be made of a THF homo- or copolymer produced by way of conventional homo- or copolymerization with cationic catalysts.

It is beneficial to use a tetrahydrofuran polymer or a copolymer of tetrahydrofuran and alkylene oxide as starting polymer, which is obtained by vacuum film evaporation, preferably under a pressure of <5 mbar and at a temperature in the range from 170–250° C.

With respect to the molecular weight of the starting polymer, the process of the invention is, in principle, not subject to any limitations. For technical reasons, however, it is better to use a starting polymer with an average molecular weight of >500 Da, preferably >600 Da or, even better, >800 Da and <10000 Da, preferably <5000 Da or, even better, <3000 Da. The range from 800–3000 Da is of particular technical interest.

During the process of the invention, separate phases—especially 2 phases—are formed which contain fractions of the starting polymer with different average molecular weights. It is to advantage if, with the process of the invention, the starting polymer is separated into two fractions, ie, into one fraction with a lower average molecular weight than that of the starting polymer and one fraction with a higher average molecular weight than that of the starting polymer. The process is preferably conducted in such a manner that the starting polymer is divided up essentially symmetrically into two separate fractions with average molecular weights M+A and M−A. M stands for the average molecular weight of the starting polymer and is at least 500 Da, preferably at least 600 Da or, even better, at least 800 Da and at the most preferably 10000 Da, or better 5000 Da or, even better, 3000 Da. A depends here on the starting polymers and is preferably 100—3000 Da or, better still, 200–15000 Da. According to another preferred embodiment, the process, in addition to the almost completely symmetrical division of the starting polymer, is conducted in such a manner that the average molecular weights of the fractions obtained are in the range [M+A]± (0.1×M) and [M−A]±(0.1×M).

The dividing up of the molecular weight can be influenced by means of a suitable choice of the cycloalkane component and a suitable choice of the quantitative proportions of starting polymer, cycloalkane, methanol and water. By means of a few, simple preliminary tests persons skilled in the art can easily determine compositions with the desired separation properties for the starting polymer in question.

In general, the proportions of cycloalkane (a), methanol (b) and water (c) in the overall mixture, ie, including the starting polymer, are each from 1–95%, preferably from 5–90%.

The constituents (a), (b) and (c) are preferably used in a ratio of 1–10 parts by weight (a): 1–10 parts by weight (b): 1–10 parts by weight (c).

In a particularly preferred embodiment of the process according to the invention the solvent mixture contains components (a), (b) and (c) in the approximate weight ratio 5:5:1 (ie, 4–6 parts by weight (a): 4–6 parts by weight (b): 0.8–1.2 parts by weight (c)). Since this quantitative relation influences the degree to which the molecular weight distribution is narrowed down and also the quantitative ratio of the phases formed, it is advisable to test the effectiveness of the method by carrying out a few preliminary tests, eg, with double or half the amount of alcohol or water, in order to obtain the desired distribution. Variations in the amount of cycloalkane usually have little influence, and should be selected in the range from 5–50 wt. % relative to the polymer.

Basically, the cycloalkane can be used in a quantity ranging from 0.2 parts by weight to 5 parts by weight per part by weight of starting polymer. It is preferable to use the cycloalkane in a quantity of 1.5 to 2.5 parts by weight per part by weight of starting polymer.

The components can be mixed at any appropriate temperature which is at least 10° C., preferably at least 20° C. and most preferably at least 30° C. and, at the most 70° C., better 60° C. or, best of all, at the most 50° C. lower than that at which the phases are separated. It is particularly beneficial to select the temperature such that two and not three phases are formed. In cases where the original molecular weight distribution and/or composition of the starting polymers or copolymers to be treated would effect the formation of three phases, the quantitative ratios (a):(b):(c) can be varied and thus the preferred formation of two phases obtained.

The process of the invention, using cycloalkanes as hydrocarbons, allows polymers of a broad molecular weight range and co-monomer content to be reliably prepared in a two-phase system. This is often not the case where aliphatic or aromatic hydrocarbons are used. Polymers obtained by film evaporation at high temperatures (170–250° C.) and under high vacuum (<5 mbar) are especially suitable for the process of the invention with alicyclics and different mixing and phase separation temperatures. Surprisingly, and deviating from the known prior art of U.S. Pat. No. 4,933,503, not three but only two phases are formed according to the preferred embodiment of the process being claimed.

In an advantageous variant of the process of the invention, the phases formed after mixing the components are separated at 40–80° C., preferably 50–80° C., the polymer fraction with the lower average molecular weight is recovered from the lower phase and the upper phase is cooled by 20–50° C. and then subjected to renewed phase separation at the lower temperature. In this way it is possible to separate off most of the cycloalkane used and 80–90% of the cyclic ethers, such as crown ethers, remaining in the feedstock. From this remaining phase one then obtains the fraction with the higher molecular weight, eg, by way of evaporation.

Both the higher- and the lower-molecular polymer portions are distinguished by very low $M_w/M_n$ values. The higher-molecular-weight fraction can be isolated from the upper phase of the original mixture and the lower-molecular fraction from the lower phase by means of standard techniques, eg, by means of evaporation, preferably at reduced pressure under vacuum. The components (a), (b) and (c), which are evaporated off, can be returned to the process without requiring preliminary purification.

With the process of the invention, it is possible to separate THF polymers with a broad molecular-weight distribution into two fractions, one of which has a higher and the other a lower average molecular weight. The ratio of the molecular weights of the two narrow-distribution polymers is about 1:2 to 2:1.

In a further preferred embodiment, the invention comprises a process for separating tetrahydrofuran polymers or copolymers of tetrahydrofuran with alkylene oxides, which were obtained by film evaporation (170–250° C., pressure <5 mbar) and have an average molecular weight M (in daltons), into two polymer fractions of narrow molecular weight distribution and molecular weights M+A and M−A (in daltons), where M is in the range from 800 to 3000 and A from 200 to 1500 Da, by mixing the starting polymers at 0–40° C. with a cycloalkane (a), methanol (b) and water (c), the proportion of the individual components (a), (b) or (c) accounting for 10–55 wt % of the total mixture, the process being characterized in that the polymer fractions are separated by means of phase separation, conducted at 40–80° C., of the two phases formed. The starting polymers or copolymers of broad molecular weight distribution are obtained to advantage by film evaporation under vacuum, at pressures below 5 mbar and temperatures of 170–250° C. The light phase obtained during the first phase separation can be cooled by 20–50° C. and the polymer recovered from the lower phase which forms during this cooling step. The proportion of cycloalkane (a) is preferably 20–30 wt % expressed in terms of the polymer. As cycloalkane (a), cyclopentane, methylcyclopentane, cyclohexane or methylhexane are used with preference. In this embodiment, the individual components are preferably mixed at a temperature 10–40° C. below that at which phase separation is conducted. It is to advantage if the tetrahydrofuran copolymer contains ethylene oxide and/or propylene oxide units. The polymer fractions are preferably isolated by way of evaporation at reduced pressure, and the condensed auxiliary agents (a), (b) and (c) can be used again, without preliminary purification, for molecular-weight fractionation.

The molecular weight distribution of polytetrahydrofuran and copolymers of tetrahydrofuran and alkylene oxide is narrowed down by blending the polymers with a mixture of an alicyclic, methanol and water in the range from 0–40° C. The two phases formed are separated at 40–80° C., and the polymers, having a narrow molecular weight distribution, isolated therefrom.

In the following examples, "parts" means parts by weight, which have the same relation to parts by volume as kilograms to litres.

EXAMPLES

Example 1

In this example a PTHF of molecular weight 2000 and polydispersity $M_w/M_n=2.4$, which was obtained by continuous polymerization on a fixed-bed catalyst according to the teaching of the PCT patent WO96/33232 and by alkaline transesterification and evaporation in a rotary-film evaporator at 220° C. and 1 mbar followed by short-path distillation, is separated into two fractions.

One part PTHF of molecular weight 2000 Da is introduced hourly into a mixing vessel and mixed continuously at 35° C. with 1.5 parts of methanol, 0.5 parts of water and 1.8 parts of cyclohexane, likewise introduced hourly. This mixture flows continuously via an overflow into a decanter which is operated at 65° C. The volume of the decanter is such that the mixture has a residence time of 5 hours, during which two distinct phases are formed. The phase boundary is detected with an optically or mechanically operated sensor (eg, a float), and is kept at about 50 vol % of the volume of liquid. While the upper phase is drawn off through a free overflow, the sensor, which detects the phase boundary, ensures that the lower phase remains at a constant level.

One obtains approximately 2.6 parts of the upper phase and 2.2 parts of the lower phase per hour. The lower phase is supplied directly to a vacuum film-type evaporator (T=180° C. and p=5 mbar). The evaporation process delivers 0.27 parts of PTHF of molecular weight 1000 hourly, which contains about 0.14 wt % crown ether and has a polydispersity $M_w/M_n=1.4$. In addition, a solvent mixture is obtained that consists of 1.37 parts of methanol, 0.40 parts of water and 1.5 parts of cyclohexane (gas-chromatographic analysis).

The continuously-drawn-off upper phase of the decanter content is cooled to 15° C. and supplied to a second decanter, in which, during a residence time of 2 hours, it separates into an upper cyclohexane phase and a high-molecular PTHF phase. The cyclohexane phase consists of 1 wt % methanol, 0.5 wt % water, 97.3 wt % cyclohexane and 1 wt % crown ether. The PTHF phase consists—to an extent of 95 wt %—of high-molecular PTHF 3000 with a polydispersity $M_w/M_n=2.1$.

Example 2

1 part of polytetramethylene ether glycol (PTMEG), produced by cationic polymerization on clay catalyst K306 (from the company Süd-Chemie AG in Munich) in the presence of acetic anhydride, and isolated by transesterification and film evaporation, is mixed at 20° C. with a solvent mixture made up of two parts of methylcyclopentane, 0.3 parts of water and 1.7 parts of methanol. The PTMEG used has a molecular weight of 1700 and a polydispersity $M_w/M_n=2.1$. From the two PTHF phases formed, one obtains 0.65 parts of PTHF 2500 ($M_w/M_n=1.8$) and 0.35 parts of PTHF 900 ($M_w/M_n=1.3$). 0.03 parts of crown ether were separated from the feedstock, as described in Example 1.

Example 3

1.5 parts of THF/ethylene oxide copolymer (molecular weight 1370 Da, $M_w/M_n=1.9$; proportion of ethylene oxide: 25 wt %) are mixed at 35° C. with 2.7 parts of methylcylohexanone, 2 parts of methanol and 1.3 parts of water and, as described in Example 1, separated at 75° C. into two phases. From the lower phase one obtains 0.7 parts of copolymer with molecular weight 900 Da and $M_w/M_n=1.3$, and from the upper phase 0.7 parts of copolymer with a molecular weight 1900 Da and $M_w/M_n=1.6$. 0.1 parts of crown ether were separated off.

What is claimed is:

1. A process for fractionating tetrahydrofuran polymers or copolymers of tetrahydrofuran with alkylene oxide, comprising:

(a) mixing a starting polymer with a cycloalkane, methanol and water at a temperature in a range of from about 0° C. to about 40° C. to form a mixture, wherein the starting polymer is a tetrahydrofuran or a copolymer of tetrahydrofuran and at least one alkylene oxide, the starting polymer being obtained by vacuum film evaporation under a pressure of less than about 5 mbar and at a temperature of from about 170° C. to about 250° C. wherein two different phases form as a result of said mixing, said two different phases consisting of an upper phase and a lower phase; and (b) separating said two different phases at a temperature of from about 40° C. to about 80° C.

2. The process of claim 1, further comprising separating the starting polymer into fractions, wherein each fraction has a polydispersity of $M_w/M_n$ which is at least 5% less than the polydispersity of $M_w/M_n$ of the starting polymer.

3. The process of claim 1, wherein the starting polymer has an average molecular weight of from about 800 Da to about 3000 Da.

4. The process of claim 1, further comprising separating the starting polymer into two fractions having an average molecular weight of M+A and M−A, wherein M is from about 800 Da to about 3000 Da and A is from about 200 Da to about 1500 Da.

5. The process of claim 1, wherein said cylcoalkane, methanol and water are present in the mixture in an amount of from about 1% to about 95% by weight of said mixture.

6. The process of claim 1, wherein said cycloalkane, methanol and water are present as a ratio of about 1 to 10 parts by weight cycloalkane to about 1 to 10 parts by weight methanol to about 1 to 10 parts by weight water.

7. The process of claim 1, wherein the cycloalkane is present as a ratio of from about 0.2 parts by weight to about 5 parts by weight per part by weight of said starting polymer.

8. The process of claim 1, wherein the cycloalkane is selected from the group consisting of cyclopentane, methylcyclopentane, cyclohexane, methylcyclohexane, and a combination thereof.

9. The process of claim 1, wherein the temperature in step (b) is at least 10° C. higher than the temperature in step (a).

10. The process of claim 1, wherein the starting polymer is a copolymer of tetrahydrofuran and at least one alkylene oxide, where said at least one alkylene oxide is selected from the group consisting of ethylene oxide, propylene oxide, and a combination thereof.

11. The process of claim 1, further comprising isolating the starting polymer by evaporation after the different phases have been separated, to separate cycloalkane, methanol and water therefrom.

12. The process of claim 11, further comprising recycling said cycloalkane, methanol and water without further purification.

13. The process of claim 1, further comprising cooling said upper phase by about 20° C. to about 50°C. and then subjecting said upper phase to further phase separation without changing its temperature.

* * * * *

UNITED STATES PATENT AND TRADEMARK OFFICE
CERTIFICATE OF CORRECTION

PATENT NO. : 6,194,503 B1
DATED : February 27, 2001
INVENTOR(S) : Herbert Müller It is certified that error appears in the above-identified patent and that said Letters Patent is hereby corrected as shown below:

Title page,
Item [56], References Cited, U.S. PATENT DOCUMENTS, insert:
-- 50553553    1/1991  Dorai
   4762951    9/1988  Mueller --.

Signed and Sealed this

Tenth Day of September, 2002

Attest:

Attesting Officer

JAMES E. ROGAN
Director of the United States Patent and Trademark Office